United States Patent [19]

Kato

[11] Patent Number: 4,981,405
[45] Date of Patent: Jan. 1, 1991

[54] FASTENER FOR SECURING PANEL-LIKE MEMBERS

[75] Inventor: Kazuo Kato, Utsunomiya, Japan

[73] Assignee: Nifco, Inc., Yokohama, Japan

[21] Appl. No.: 443,308

[22] Filed: Nov. 30, 1989

[30] Foreign Application Priority Data

Dec. 3, 1988 [JP] Japan .......................... 63-157875[U]

[51] Int. Cl.$^5$ ............................................. F16B 21/00
[52] U.S. Cl. .................................. 411/349; 411/553; 411/508; 24/297
[58] Field of Search ............... 411/508, 509, 510, 349, 411/549, 553, 913; 24/297, 453; 174/138 D

[56] References Cited

U.S. PATENT DOCUMENTS

| | | | |
|---|---|---|---|
| 3,123,389 | 3/1964 | Biesecker | 411/349 |
| 4,652,192 | 3/1987 | Schaller | 411/549 |
| 4,810,147 | 3/1989 | Hirohata | 411/508 |

FOREIGN PATENT DOCUMENTS

| | | | |
|---|---|---|---|
| 741059 | 8/1966 | Canada | 24/297 |
| 1107029 | 5/1961 | Fed. Rep. of Germany | 24/297 |

*Primary Examiner*—Neill R. Wilson
*Attorney, Agent, or Firm*—Schwartz & Weinrieb

[57] ABSTRACT

A fastener is provided for securing a first panel-like member to a second panel-like member by securing, in a state with a fastener temporarily secured to the first panel-like member, an elastic fastening portion of the fastener projecting from the first panel-like member toward the second panel-like member. It includes a first flanged portion having long and short sides, a second flanged portion having long and short sides, projecting from the center of the first flange and spaced apart from the first flange by means of a distance corresponding to the thickness of the first panel-like member, an elastic fastening portion projecting from the top of the second flange, and an elastic portion projecting from the second flange toward the first flange and engaged within a hole of the first panel-like member. The long side of the first flange is longer than the long side of the second flange. The short side of the first flange is longer than the short side of the second flange. The first and second flanges are disposed so that the respective long sides traverse each other substantially at right angles. The second flange is inserted within the hole of the first panel-like member and turned by means of a predetermined angle, thus clamping the first panel-like member between the first and second flanges.

9 Claims, 3 Drawing Sheets

FASTENER FOR SECURING PANEL-LIKE MEMBERS

FIELD OF THE INVENTION

This invention relates generally to a fastener for securing panel-like members together and, more particularly, to a fastener which can be secured to the surface of a panel-like member such that its stem, which is disposed over the surface of the panel-like member, is flat.

DESCRIPTION OF THE PRIOR ART

Generally, when securing together internal and external automobile parts by means of fasteners, fasteners are temporarily secured to the automobile parts, and in this state the parts are positioned and urged against body panels moving along an assembly line, thus securing the parts by means of a one-touch operation.

The fastener adopts a structure which enables it to be temporarily secured to a part to be mounted upon a support panel (as disclosed in Japanese Utility Model Publication 62-16489 and Japanese Utility Model Public Disclosure 59-130321).

FIG. 5 shows a typical example of the prior art fastener. As is shown, the fastener comprises a disk-like stem 1, an anchor-like elastic fastening portion 2 provided upon one side of the stem for securing the fastener to the vehicle body, and a boss 3 projecting from the center of the other side of the disk-stem. A plurality of pawls 4 project from the boss 3.

The boss 3 is inserted within a mounting hole 5a formed within the automobile part 5. At this time, the pawls 4 are elastically flexed, and when the boss 3 is completely disposed within the hole 5a, the pawls 4 are elastically restored so as to clamp the automobile part 5 in co-operation with the stem 1. In this way, the fastener is temporarily secured to the part 5.

However, when the automobile part 5 is a thin panel-like member such as, for example, a mudguard, the boss 3 and pawls 4 project substantially from the surface of the automobile part 5. Therefore, the fastener impairs the finished appearance of the automobile part asembly. In addition, the mounting hole 5a is not completely closed, whereby mud and water can readily reach the automobile panel side through means of the hole.

OBJECT OF THE INVENTION

The present invention is intended to solve the above problem, and its object is to provide a fastener for securing a panel-like member, which can be temporarily secured to the panel-like member in a relatively flat state, that is, in a state not projecting substantially from the front surface of the panel-like member.

SUMMARY OF THE INVENTION

In order to attain the above object of the present invention, there is provided a fastener, for securing a first panel-like member to a second panel-like member by securing, when the fastener temporarily secured to the first panel-like member, an elastic fastening is portion of the fastener projecting from the first panel-like member to the second panel-like member, comprising a first flanged portion having long and short sides, a second flanged portion having long and short sides, projecting from the center of the first flanged portion and spaced apart from the first flanged portion by means of a distance corresponding to the thickness of the first panel-like member, the long side of the first flange being longer than the long side of the second flange, the short side of the first flange being longer than the short side of the second flange, the first and second flanges being disposed so that the respective long sides traverse each other substantially at right angles, an elastic fastening portion projecting from the top of the second flange and an elastic portion projecting from the second flange toward the first flange and engaged within a hole of the first panel-like member, the second flange being inserted within the hole of the first panel-like member and turned through means of a predetermined angle, thus clamping the first panel-like member between the first and second flanges.

In the fastener having the above construction, the second flange is inserted within the a hole formed within the a panel-like member and turned by means of a predetermined angle. The panel-like member is clamped between the first and second flanges, and in this state temporary securement of the panel-like member to the fastener is completed with a clicking sound.

In this state of temporary securement, the first flange covers the periphery of the hole formed within the panel-like portion. Since the first flange is flat, it will not project substantially from the surface of the panel-like member. Then, the elastic fastening portion projecting from the top of the second flange is inserted into a mounting hole formed within another panel-like member, thus completing the mounting of the first panel-like member upon the second panel-like member.

BRIEF DESCRIPTION OF THE DRAWINGS

The above and other objects and features of the invention will become more apparent from the following detailed description with reference to the accompanying drawings, wherein like reference characters designate like or corresponding parts throughout the several views, and wherein.

DETAILED DESCRIPTION OF THE PREFERRED EMBODIMENT

Figure 1:
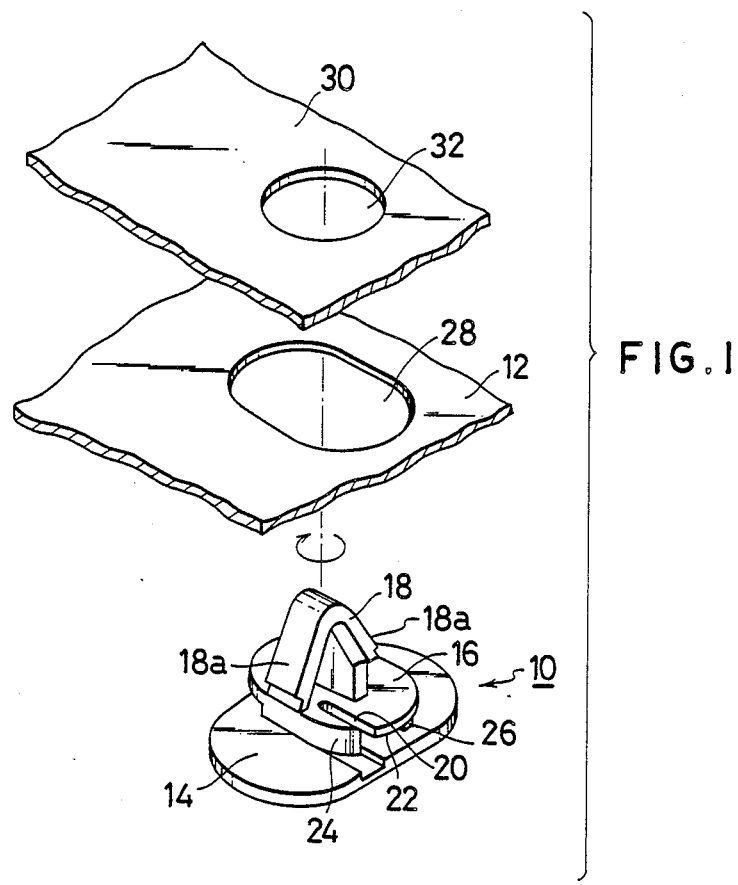
FIG. 1 is a perspective view showing a fastener according to the invention, a mudguard and a fender panel.

FIG. 1 shows one embodiment of the fastener for securing a panel-like member according to the invention. A mudguard 12 as a first panel-like member is secured to the fastener 10, and in this state the fastener 10, along with the mudguard is secured to a fender panel 30 as a second panel-like member.

The fastener 10 is a plastic injection molding. It has a first flange 14 having long and short sides (a large oval flange in the illustrated embodiment), a second flange 16 having long and short sides which are respectively shorter than those of the first flange 14 (a small oval flange in the illustrated embodiment), located at the center of the first flange and spaced apart from the same by means of a distance corresponding to the thickness of the mudguard 12, the long sides of the first and second flanges 14 and 16 traversing each other substantially at right angles, and an anchor-shaped elastic fastening portion 18 projecting upwardly from the top of the second flange 16. The first flange 14 may be of any shape capable of concealing a hole 28 of the mudguard 12 which will be explained afterward while the second flange 16 is required to be insertable into the hole 28 and therefore have a similar shape to that of the hole 28.

The second flange 16 has notches 20 provided within the opposite ends thereof in the longitudinal direction and a notch 22 provided upon the bottom side thereof. Sidewise of each notch 20, an elastic portion 24 projecting downwardly from the second flange 16 toward the first flange 14 is provided upon each side of the second flange 16 in the longitudinal direction thereof such that it is separate from the first flange 14.

Sidewise of each elastic portion 24, an engagement projection 26 projects integrally upwardly from the first flange 14.

The mudguard 12 is formed provided, at the position where the fastener is to be mounted, with a hole 28, which is slightly greater in size than the second flange 16 and smaller in size than the first flange 14.

The elastic portions 24 and engagement projections 26 project to have substantially the same longitudinal extent when the oppositely paired portions 24 and projections 26 are considered together, as the width of the hole 28.

Figure 2:
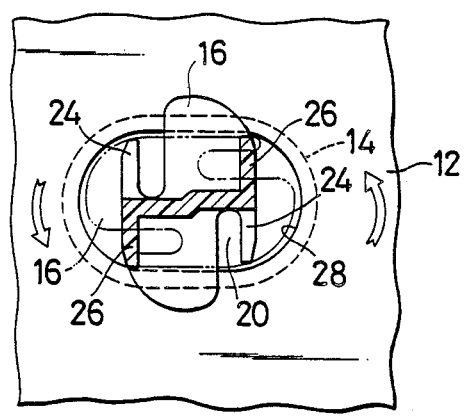
FIG. 2 is a sectional view showing the fastener shown in FIG. 1 in a state temporarily mounted upon the mudguard.

In accordance with the above construction, in order to secure the fastener 10 to the mudguard 12, the second flange 16 is fitted within the hole 28 as shown by means of the imaginary line in FIG. 2. Then, in the state with the second flange 16 projecting from the back side of the mudguard 12 the fastener 10 is rotated throught means of 90 degrees in the counterclockwise direction. As a result, the long side of the second flange 16 is disposed perpendicular to the major axis of the hole 28, and the fastener is locked within the hole 28 with its lower surface in engagement with the edge of the hole 28.

During the rotational operation, each elastic portion 24 comes in elastic contact with the inner periphery of the hole 28 so as to offer a predetermined resistance to the rotation thereof, and in the completely rotated state it is elastically restored with a click so as to assume a stable state in which rotation of the fastener 10 in the opposite direction is prevented. Thus, when this sound is heard, the completion of the engagement can be confirmed.

In this state, the first flange 14 is perfectly overlapped over the edge of the hole 28. Thus, the surface of the mudguard 12 is completely covered, and as shown in FIG. 3 the fastener 10 is temporarily secured such that the mudguard 12 is completely clamped between the first and second flanges 14 and 16.

Figure 3:
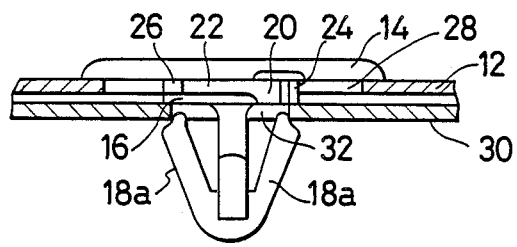
FIG. 3 is a sectional view showing the fastener shown in FIG. 1 in a state secured to the fender panel while being secured to the mudguard.

After the above operation is completed, the elastic fastening portion 18 projecting from the back side of the mudguard 12 as shown in FIG. 3 is positioned with respect to a fastener mounting hole 32 formed within the fender panel 30, and in this state it is moved, together with the mudguard, such that the member 18 enters hole 32. As a result, the elastic fastening portion 18 is elastically contracted so as to be inserted within the mounting hole 32. In this state, the opposite side legs 18a of the elastic fastening portion 18 are elastically opened so as to produce a clicking sound, and in this state detachment from the fender panel 30 is prevented.

Figure 4:
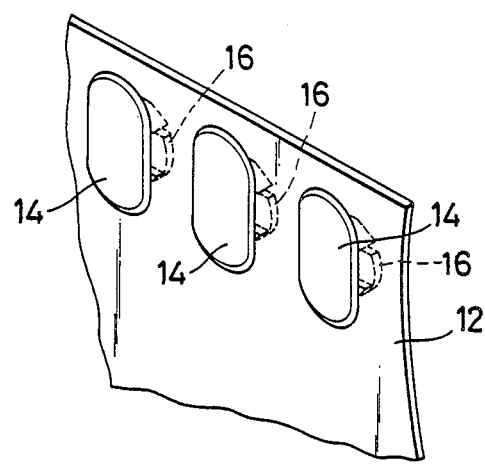
FIG. 4 is a perspective view showing the fastener viewed from the front side of the mudguard.
Figure 5:
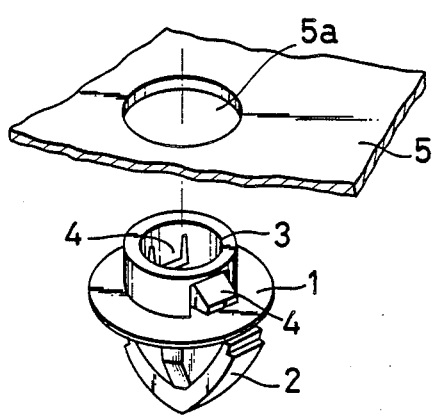
FIG. 5 is a perspective view showing a prior art fastener.

In the mounted state, as shown in FIG. 4, only the flat surface of the first flange 14 is visible upon the front side of the mudguard 12, and there is neither any raised portion nor any depressed portion. Furthermore, the mounting portion is further concealed by means of the painting done after the assembling operation, thus providing an excellent appearance.

In the above embodiment the elastic portions 24 are provided upon each side of a lower portion of the second flange 16. However, where the direction of rotation is not restricted, two elastic portions may be provided upon each side.

Furthermore, while in the above embodiment a combination of two oval shapes is adopted, one as the shape of the hole of the mudguard and the other as the shape of the second flange, and the fastener is rotated 90 degrees when it is engaged within the mudguard, the fastener may have a construction such that when the fastener is rotated the second flange disposed within the hole is engaged with the edge of the hole. For example, therefore, it is possible to adopt a combination of rectangular shapes or a combination of square or triangular shapes. When square shapes are combined, the rotational angle for the fastener is 45 degrees, and when triangular shapes are combined, the rotational angle is 60 degrees.

In this embodiment, the fastener according to the invention is used for securing a mudguard, but it may of course be used for mounting any part whose stem should not project outwardly for appearance purpose or for other reasons.

As has been described in the foregoing, with the fastener for securing a panel-like member according to the present invention the second flange is inserted into a slot or similar hole formed within the panel-like member and turned by means of a predetermined angle. The panel-like member is thus clamped between the first and second flanges with a clicking sound, thus completing the temporary securement of the fastener. In the temporarily secured state, the first flange covers the periphery of the hole of the panel-like member. Since this first flange is flat, it will not project substantially from the front surface of the panel-like member. Furthermore, it is possible to confirm the completion of the engagement by means of the clicking sound.

Thus, according to the invention, an improved appearance of the panel-like member mounted upon the vehicle panel can be realized. In addition, since there is no gap defined between the fastener components, there is no possibility of intrusion of mud and water.

Obviously, many modifications and variations of the present invention are possible in light of the above teachings. It is therefore to be understood that within the scope of the appended claims, the present invention may be practiced otherwise than as specifically described herein.

What is claimed is:

1. A fastener for securing a first panel-like member, having a first aperture of a predetermined configuration and size formed therein, to a second panel-like member, having a second aperture formed therein, comprising:
  a first flange having a first surface for engagement with a first surface of said first panel-like member;
  a second flange integrally connected to said first flange and having a first surface for engagement with a second surface of said first panel-like member, and having a predetermined configuration which is similar to said predetermined configuration of said first aperture formed within said first panel-like member yet smaller in size than said first aperture formed within said first panel-like member so as to permit said second flange to be inserted through said first aperture of said first panel-like member and rotated through a predetermined angle with respect to said first panel-like member so as to prevent removal of said fastener from said first panel-like member as a result of said engagement of said first surfaces of said first and second flanges with said first and second surfaces of said first panel-like member, said first flange having a predetermined configuration and size with respect to said first aperture of said first panel-like member such that when said fastener is rotated so as to prevent removal of said fastener from said first panel-like member, said first flange completely covers said first aperture formed within said first panel-like member; and elastic fastening means integrally formed upon a second surface of said second flange for insertion through said second aperture of said second panel-like member and for engagement with said second panel-like member so as to fixedly secure said first panel-like member to said second panel-like member.

2. A fastener as set forth in claim 1, further comprising:

elastic means integrally formed with said second flange and projecting toward said first flange for disposition within said first aperture defined within said first panel-like member when said second flange is inserted through said first aperture of said first panel-like member, for engaging sidewall portions of said first panel-like member defining said first aperture within said first panel-like member so as to provide a predetermined resistance to rotation of said fastener through said predetermined angle with respect to said first panel-like member as said fastener is rotated through said predetermined angle from a first angular position to a second angular position, and for snap-engaging another sidewall portion of said first panel-like member defining said first aperture within said first panel-like member when said fastener is disposed at said second angular position so as to prevent rotation of said fastener back to said first angular position.

3. A fastener as set forth in claim 2, wherein:
said predetermined rotational angle is 90°.

4. The fastener according to claim 1, wherein said first and second flanges have an oval shape.

5. The fastener according to claim 4, wherein:
said first flange is greater in size than that of said second flange.

6. A fastener as set forth in claim 4, wherein:
said first aperture of said first panel-like member has a substantially oval configuration.

7. A fastener as set forth in claim 4, wherein:
each of said first and second oval-shaped flanges has a pair of long sides and a pair of short sides with said long sides of said second flange being shorter than said long sides of said first flange, and said short sides of said second flange being shorter than said short sides of said first flange, and wherein further said long sides of said second flange are disposed substantially perpendicular to said long sides of said first flange.

8. A fastener as set forth in claim 4, wherein:
said first and second flanges are disposed substantially co-axially with respect to each other.

9. A fastener as set forth in claim 8, wherein:
said second flange is axially spaced from said first flange by means of a distance corresponding to a thickness dimension of said first panel-like member.

* * * * *